United States Patent
Olvera (10) Patent No.: US 9,319,526 B2
(45) Date of Patent: Apr. 19, 2016

(54) SYSTEM AND METHOD FOR GRANTING DELAYED PRIORITY ACCESS TO A RESOURCE

(71) Applicant: Nuance Communication, Inc., Burlington, MA (US)

(72) Inventor: Eduardo Olvera, Phoenix, AZ (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/668,050

(22) Filed: Nov. 2, 2012

(65) Prior Publication Data

US 2014/0126716 A1    May 8, 2014

(51) Int. Cl.
- H04M 3/00 (2006.01)
- H04M 5/00 (2006.01)
- H04M 3/523 (2006.01)

(52) U.S. Cl.
CPC ............ *H04M 3/5235* (2013.01); *H04M 3/523* (2013.01)

(58) Field of Classification Search
CPC ..... H04M 3/523; H04M 3/51; H04M 3/5233; H04M 3/5232

USPC ............. 379/265.11, 265.01, 266.01, 209.01, 379/265.13, 265.05, 265.12, 207.15, 242

See application file for complete search history.

(56) References Cited

U.S. PATENT DOCUMENTS

| | | | |
|---|---|---|---|
| 6,665,396 B1 * | 12/2003 | Khouri et al. | 379/266.01 |
| 6,754,332 B1 * | 6/2004 | Kneipp et al. | 379/265.13 |
| 6,771,760 B1 * | 8/2004 | Vortman et al. | 379/209.01 |
| 6,975,720 B1 * | 12/2005 | Crook | 379/266.01 |
| 7,430,290 B2 * | 9/2008 | Zhu | 379/265.01 |
| 8,396,204 B2 * | 3/2013 | Guerrero et al. | 379/265.01 |
| 2006/0173724 A1 * | 8/2006 | Trefler et al. | 705/8 |

* cited by examiner

*Primary Examiner* — Thjuan K Addy
(74) *Attorney, Agent, or Firm* — Hamilton, Brook, Smith & Reynolds, P.C.

(57) ABSTRACT

A user service center facilitates communication between a user and an agent at the user service center. At peak use times, the user service center is connected to a surplus of users with respect to its number of agents, and the user service center has the users wait to communicate with an agent. In one embodiment, the system and method described herein give the user the option to reconnect with the user service center at a later, off-peak, time. In exchange, the user is granted an identifier indicating priority access to an agent at the off-peak time. In this way, the user does not have to wait to communicate with an agent during the subsequent communication during the off-peak time.

20 Claims, 7 Drawing Sheets

SYSTEM AND METHOD FOR GRANTING DELAYED PRIORITY ACCESS TO A RESOURCE

BACKGROUND OF THE INVENTION

A user service center facilitates a communication between a user and an agent at the user service center. Many times, a user service center can accept connections from more users than the user service center employs agents. When this happens, the user service center typically has the excess users wait until an agent becomes available.

SUMMARY OF THE INVENTION

In one embodiment, a method of managing calls at a user service center includes determining whether an identifier associated with a user qualifies the user for priority access to an agent at a user service center based on a previous interaction with the user service center, and if so, the method provides for giving priority access to the user to interact with the agent.

In another embodiment, the method includes, during the previous interaction, providing the user with an option of selecting a later timeslot from a plurality of timeslots to complete the interaction with the user service center during the later timeslot. The method may further include, using the identifier, associating the user with a priority access queue during the later timeslot.

In another embodiment, the method may also include providing the plurality of timeslots to the user, the plurality of timeslots associated with at least one of an estimated low volume user-to-agent interaction period, a high idle-agent-to-active-agent ratio time period, a period with a high number of active agents, an economically efficient period, a period leveraging resources of an outside center, and a new time slot designated for priority access. The method may further include providing the user with a notification to initiate the interaction during the later timeslot with the user service center, the notification being provided at a time associated with the later timeslot. The method may also include periodically providing the notification during the later timeslot until such a time the user initiates the interaction.

The method may also include during the previous interaction, creating and, if necessary, providing the identifier to the user, the identifier providing the user with priority access to the user service center at a timeslot to continue the previous interaction. The method may further include mapping the identifier to a priority access mechanism associated with the timeslot.

The identifier may include a relative priority identifier that identifies a relative priority of the user with respect to other users associated with respective identifiers qualifying the other users with priority access to the user service center. The interaction may be at least one of the following: a phone call, live instant messaging, real-time text messaging, video-chat, remote assistance, and other online interaction.

The identifier may be associated with a timeslot to continue the previous interaction during which the user may receive priority access to the user service center, but not during other timeslots. The method may further include, for each timeslot, providing a restricted number of identifiers qualifying users for priority access to the user service center.

The restricted number may be selected in a manner that prevents an overflow of interactions during the timeslot based on a predetermined estimated volume of interactions expected to be received during the timeslot.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
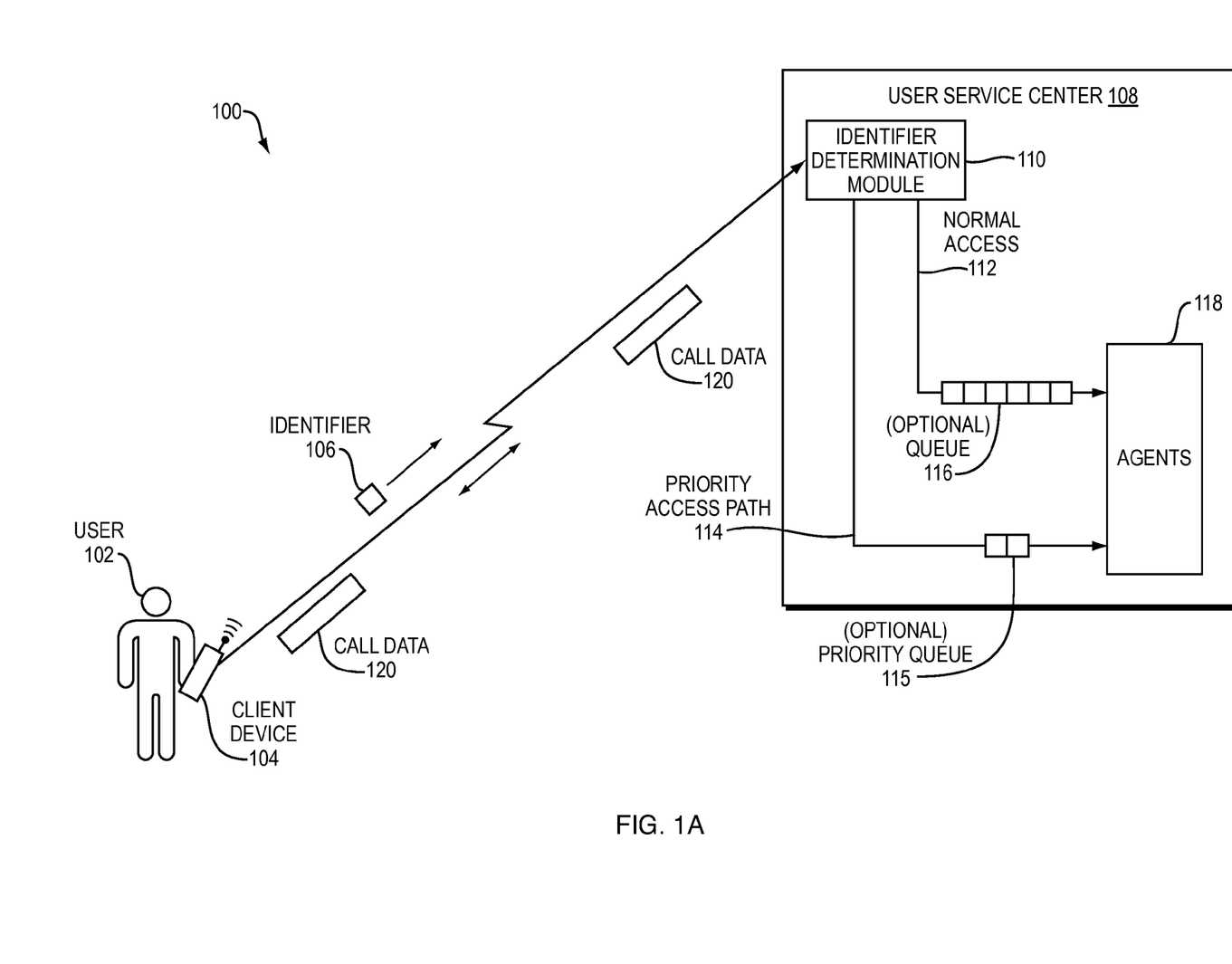
FIGS. 1A-1B are a block diagrams illustrating an example embodiment of a user service center configured to employ delayed priority access.

FIG. 1A is a block diagram 100 illustrating an example embodiment of a user service center 108 configured to employ delayed priority access. Many user service centers 108, such as a call service center or a chat service center, have peak load times when more callers or users access the user service center 108 than agents available at the user service center 108. As a result, many users have to wait to speak to an agent at the user service center 108. At other times of the day, fewer callers access the system than agents available at the user service center 108. As a result, agents can be idle at those off-peak load times. Ideally, users of the user service center 108 would call in a uniformly distributed pattern during the day. In this manner, agents are neither overloaded nor idle, and users would have much smaller wait times.

In one embodiment, the delayed priority access system addresses this problem by redistributing the user calls into the uniformly distributed pattern throughout the day. It should be understood that the user service center 108 may employ telephone communications, and/or other modes of communications such as text messaging, instant messaging, online chat, providing remote service, and video chat. While descriptions herein refer to telephone communications as the mode of communication between a user 102 and the user service center 108, other modes of communications are also applicable to the described system and method.

A user 102 can call the user service center 108 using a client device 104. Examples of the client device 104 include a mobile phone, mobile device, computer, laptop, automobile, appliances, a wearable computer, a computing enabled accessory, or a kiosk. The client device can further be employed to begin the interaction offline, and only connect to the network when necessary. Upon calling the user service center 108, the client device 104 transmits an identifier 106 to the user service center 108 to an identifier determination module 110. The identifier 106 is a token that the user service center 108 previously issued or determined. The user service center 108 issues or determines the identifier 106 during a previous interaction with the user. In the previous interaction, the user 102 elects to call the user service center 108 back during a nonpeak hour in exchange for priority access during the off-peak hour. The user service center 108 associates the identifier 106 with the user 102, either by generating a new identifier 108 or by determining a pre-existing identifier of the user 102. The identifier 106 can be, for example, a phone number of the user 102 (e.g., as determined by caller ID), an account number of the user 102, personally identifiable information of the user 102, or a number and/or code generated by the user service center 108. The user service center 108 transmits the number and/or code to the user 102 during the previous interaction. The client device 104 can transmit the number and/or code either in an automated manner or after user input of the number and/or code in the present interaction. Other examples of the identifier 106 can include automatic numbering information (ANI), a user identification mechanism (e.g., a username or account number), a special key or code that the user 102 can enter, or a hotline for users with higher priority (e.g. dialed number identification service (DNIS)).

The user service center 108, upon receiving the identifier 106 at the identifier determination module 110, determines whether the user 102 associated with the identifier 106 is qualified for priority access to agents. If the identifier determination module 110 determines that the identifier 106 either is nonexistent or does not qualify the user 102 for priority access, the identifier determination module 110 routes call data 120 to a normal access line 112. The normal access line 112 can optionally include a queue 116. After waiting in the queue 116, the user 102 is connected to one of the agents 118 at the user service center 108.

On the other hand, if the identifier determination module 110 determines that the identifier 106 is qualified for priority access, the identifier determination module 110 routes the call data 120 to a priority access path 114. The priority access path 114 then gives the user 102 priority access to one of the agents 118. Priority access can be implemented in a variety of ways, such as by providing a priority queue 115 with a higher priority along the priority access path 114, or specific pool of agents primarily serving users with priority access. The priority access time window can be determined by a statistical analysis of call load times during a typical day. In another embodiment, where the specific pool of agents is employed to handle priority access calls, the calls can be scheduled based on the number of agents available during a specific time slot.

Figure 1B:
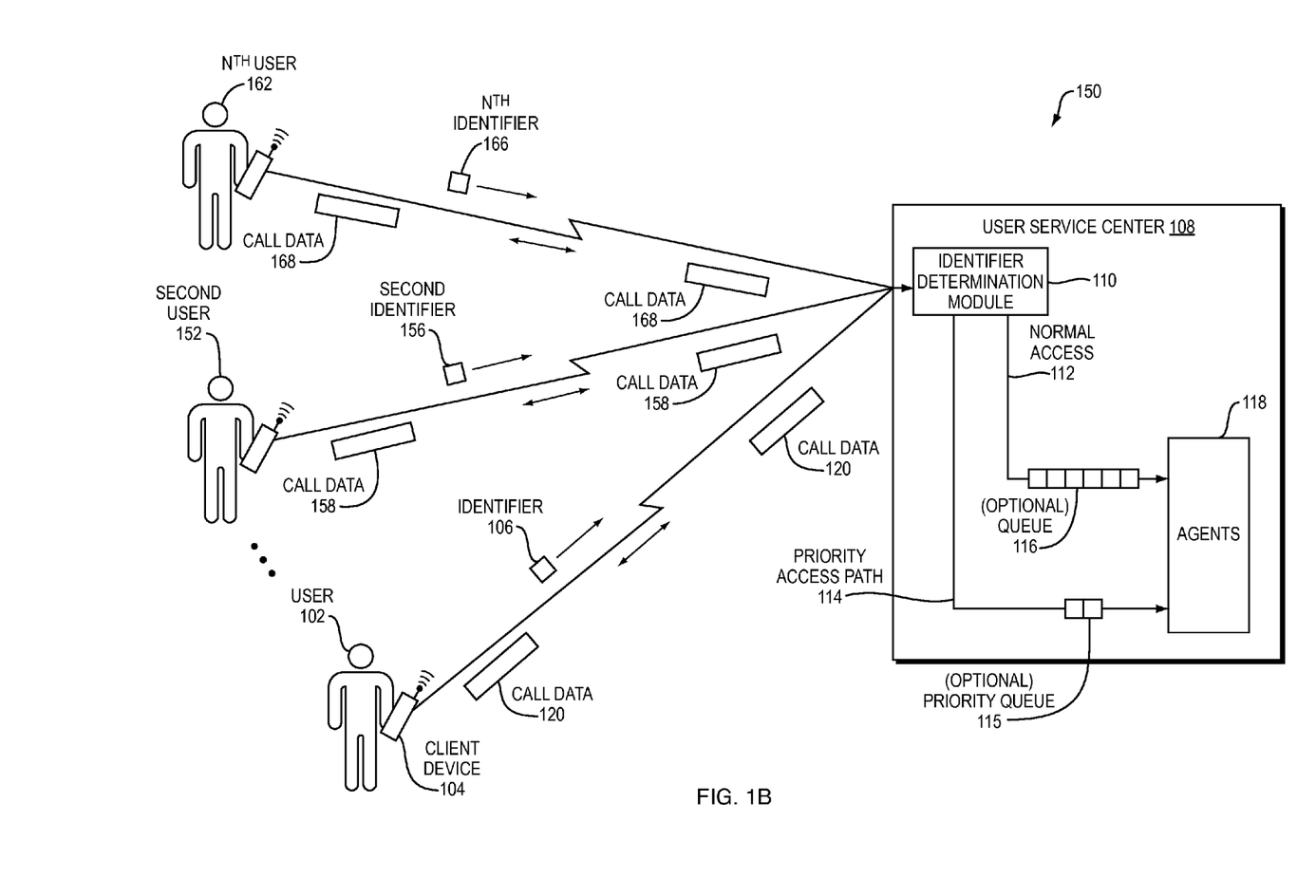

FIG. 1B is a block diagram 150 illustrating another example embodiment of a user service center 108 configured to employ delayed priority access. The embodiment illustrated in FIG. 1B is similar to the embodiment illustrated in FIG. 1A. However, FIG. 1B illustrates a second user 152 and an Nth user 162 communicating with the user service center 108.

The second user 152 transmits a second identifier 156 to the identifier determination module 110 at the user service center. If the identifier determination module 110 determines that the second identifier 156 either is nonexistent or does not qualify the second user 152 for priority access, the identifier determination module 110 routes call data 120 to the normal access line 112. After waiting in the queue 116, the second user 152 is connected to one of the agents 118 at the user service center 108.

On the other hand, if the identifier determination module 110 determines that the second identifier 156 is qualified for priority access, the identifier determination module 110 routes the call data 158 to a priority access path 114. The priority access path 114 then gives the second user 152 priority access to one of the agents 118.

Similarly, the Nth user 162 transmits a Nth identifier 166 to the identifier determination module 110 at the user service center. If the identifier determination module 110 determines that the Nth identifier 166 either is nonexistent or does not qualify the Nth user 162 for priority access, the identifier determination module 110 routes call data 120 to the normal access line 112. After waiting in the queue 116, the Nth user 162 is connected to one of the agents 118 at the user service center 108.

On the other hand, if the identifier determination module 110 determines that the Nth identifier 162 is qualified for priority access, the identifier determination module 110 routes the call data 168 to a priority access path 114. The priority access path 114 then gives the Nth user 162 priority access to one of the agents 118.

Figure 2:
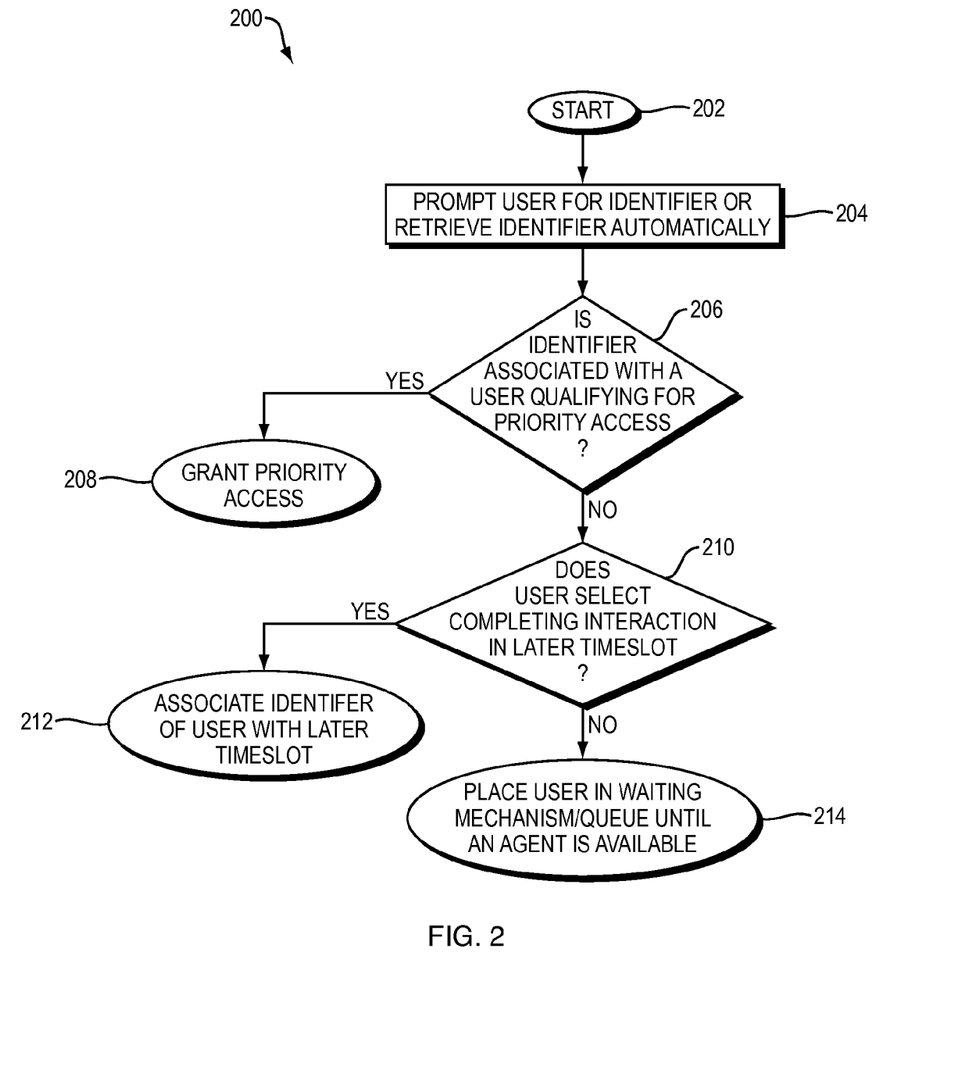
FIG. 2 is a flow diagram illustrating an example embodiment of granting priority access to user and identifying a user with priority access.

FIG. 2 is a flow diagram 200 illustrating an example embodiment of granting priority access to user and identifying a user with priority access. After the process begins (202), the user service center prompts the user for the identifier, or it retrieves the identifier automatically (204). The user can be prompted to enter an identifier, such as a username, account number, or number assigned to the user, such as the number assigned during a previous phone call. The user service center can retrieve the identifier automatically by using caller ID or ANI. Next, the user service center determines whether the identifier is associated with a user that qualifies for priority access (206). If the user does qualify for priority access, the user service center grants priority access (208).

If the identifier is not associated with a user qualifying for priority access, the user service center prompts the user and determines whether the user selects to complete the interaction in a later time slot (210). If the user does select to complete the interaction in a later time slot (210), the user service center associates an identifier of the user with a later time slot (212). Otherwise, the user service center places the user in a waiting mechanism/queue until an agent is available (214).

The identifier does not necessarily have to be retrieved by the user service center or entered by the user. In the event that no identifier is retrieved or entered, the user service center recognizes that the user is not authorized for priority access and the user service center prompts user to select completing interaction a later time slot (210).

Figure 3A:
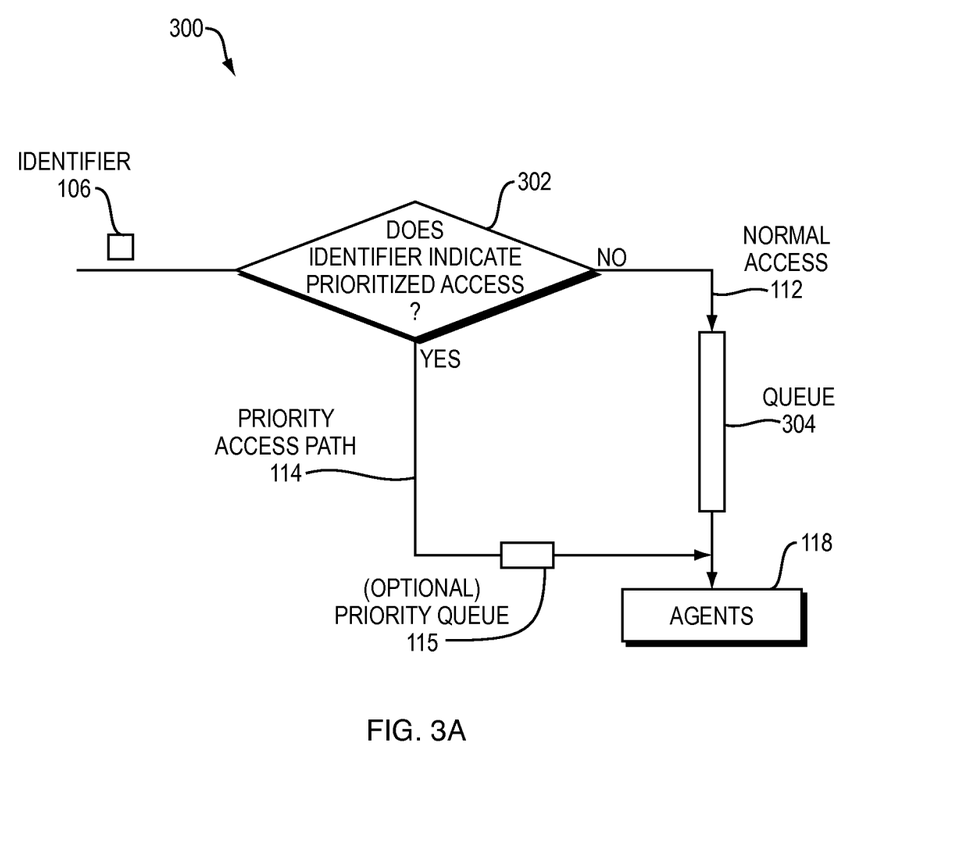
FIG. 3A is a block diagram illustrating an example embodiment of an implementation of priority access.

FIG. 3A is a block diagram 300 illustrating an example embodiment of an implementation of priority access. The identifier determination module receives the identifier 106 and, at a decision block 302, determines whether the identifier 106 indicates priority access. If the identifier does not indicate the user is authorized for priority access, the call is routed into a normal access line 112, which can include a queue 304, before the user is routed to one of the agents 118. On the other hand, if the identifier indicates the user is authorized for priority access, then the call is routed to a priority access path 114 which skips the queue 304 and gives more direct access to the agents 118.

Figure 3B:
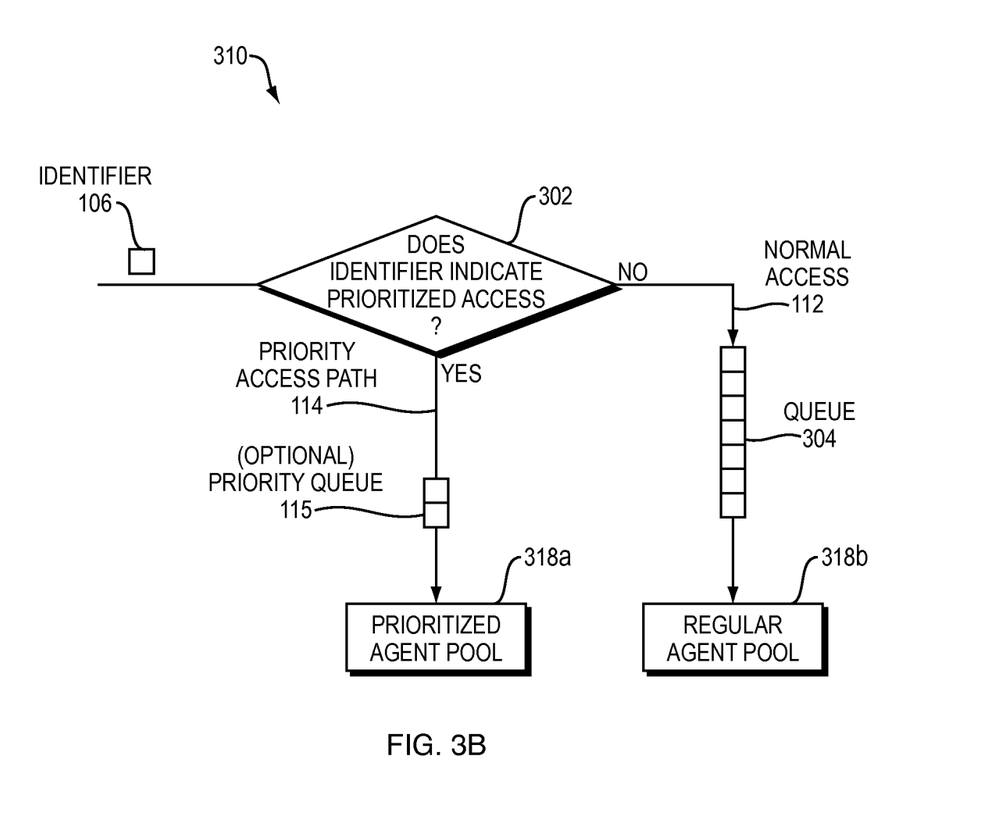
FIG. 3B is a block diagram illustrating another example embodiment of implementing priority access to agents. The identifier determination module receives

FIG. 3B is a block diagram 310 illustrating another example embodiment of implementing priority access to agents. The identifier determination module receives the identifier 106 at the decision block 302. The decision block 302 determines whether the identifier indicates whether the user is authorized for priority access. If the identifier does not indicate the user is authorized for priority access, then the call is routed onto the normal access line 112 and then into a queue 304, which is then routed to a regular agent pool 318b. If the decision block determines that the identifier does indicate the user is authorized for priority access, then the call is routed onto the priority access path 114 and into a priority agent pool 318a. The priority agent pool 318a is a pool of agents that are available to priority users to improve service to authorized users.

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

Figure 4:
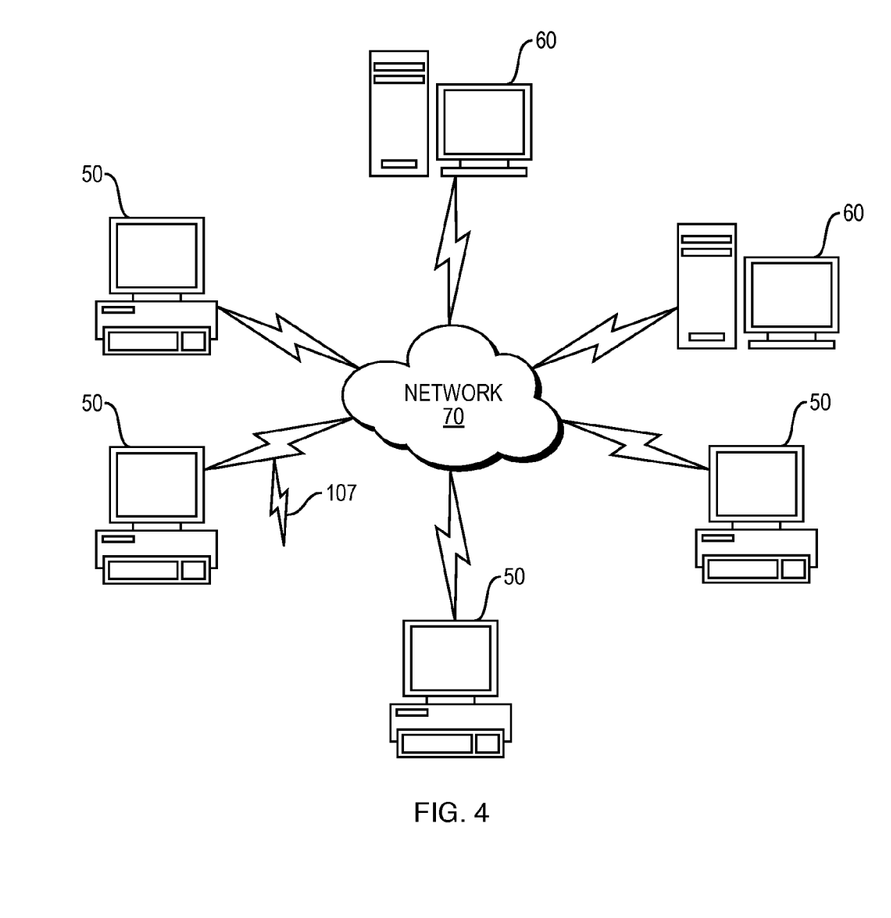
FIG. 4 illustrates a computer network or similar digital processing environment in which embodiments of the present invention may be implemented.

FIG. 4 illustrates a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can be the client device 104. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
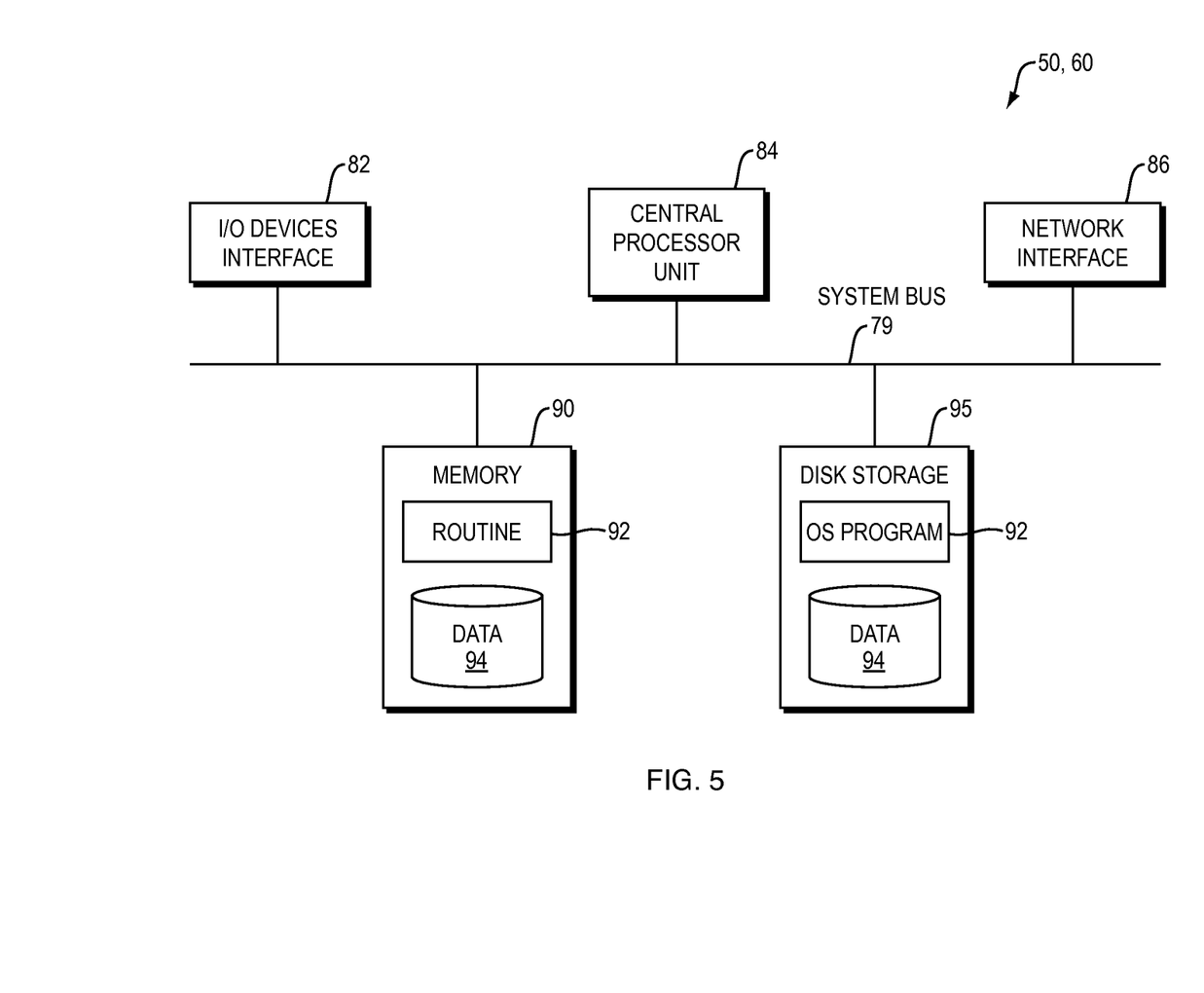
FIG. 5 is a diagram of the internal structure of a computer (e.g., client processor/device or server computers) in the computer system of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). The computer 50, 60 can employ the network interface 86 to leverage the disk storage 95 and memory 90 of another computer 50, 60 connected to the network 70 as its own storage and/or memory. Memory 90 provides volatile storage for computer software instructions 92 and data 94 used to implement an embodiment of the present invention (e.g., priority access in a user service center code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method of managing calls at a user service center, the method comprising:
   determining whether an identifier associated with a user qualifies the user for priority access to an agent at a user service center based on a previous interaction with the user service center, the priority access granting access to a priority access queue; and
   if so, giving priority access to the user to interact with the agent by directing the user into the priority access queue using the identifier associated with the user, and if not, denying priority access to the user by directing the user into a standard access queue, the priority access queue corresponding to a priority agent pool including the agent, the standard access queue corresponding to a standard agent pool being distinct from the priority agent pool and excluding the agent.

2. The method of claim 1 further comprising:
   during the previous interaction, providing the user with an option of selecting a later timeslot from a plurality of timeslots to complete the interaction with the user service center during the later timeslot.

3. The method of claim 2 further comprising providing the plurality of timeslots to the user, the plurality of timeslots associated with at least one of an estimated low volume user-to-agent interaction period, a high idle-agent-to-active-agent ratio time period, a period with a high number of active agents, an economically efficient period, a period leveraging resources of an outside center, and a new time slot designated for priority access.

4. The method of claim 2 further comprising providing the user with a notification to initiate the interaction during the later timeslot with the user service center, the notification being provided at a time associated with the later timeslot.

5. The method of claim 4 further comprising periodically providing the notification during the later timeslot until such a time the user initiates the interaction.

6. The method of claim 1 further comprising:
during the previous interaction, creating and, if necessary, providing the identifier to the user, the identifier providing the user with priority access to the user service center at a timeslot to continue the previous interaction; and
mapping the identifier to a priority access mechanism associated with the timeslot.

7. The method of claim 1 wherein the identifier includes a relative priority identifier that identifies a relative priority of the user with respect to other users associated with respective identifiers qualifying the other users with priority access to the user service center.

8. The method of claim 1 wherein the interaction is at least one of the following:
a phone call, live instant messaging, real-time text messaging, video-chat, remote assistance, speech recognition interaction, natural language understanding interaction, kiosk interaction, and other interaction.

9. The method of claim 1 further comprising:
wherein the identifier is associated with a timeslot to continue the previous interaction during which the user may receive priority access to the user service center, but not during other timeslots; and
for each timeslot, providing a restricted number of identifiers qualifying users for priority access to the user service center.

10. The method of claim 9 wherein the restricted number is selected in a manner that prevents an overflow of interactions during the timeslot based on a predetermined estimated volume of interactions expected to be received during the timeslot.

11. A system for managing calls at a user service center, the system comprising:
an identifier determination module configured to determine whether an identifier associated with a user qualifies the user for priority access to an agent at a user service center based on a previous interaction with the user service center, the priority access granting access to a priority access queue; and
an access granting module configured to, if so, give priority access to the user to interact with the agent by directing the user into the priority access queue using the identifier associated with the user, and if not, deny priority access to the user by directing the user into a standard access queue, the priority access queue corresponding to a priority agent pool including the agent, the standard access queue corresponding to a standard agent pool being distinct from the priority agent pool and excluding the agent.

12. The system of claim 11, further comprising:
a delayed access module configured to, during the previous interaction, provide the user with an option of selecting a later timeslot from a plurality of timeslots to complete the interaction with the user service center during the later timeslot.

13. The system of claim 12 wherein the delayed access module is further configured to provide the plurality of timeslots to the user, the plurality of timeslots associated with at least one of an estimated low volume user-to-agent interaction period, a high idle-agent-to-active-agent ratio time period, a period with a high number of active agents, an economically efficient period, a period leveraging resources of an outside center, and a new time slot designated for priority access.

14. The system of claim 12 wherein the delayed access module is further configured to provide the user with a notification to initiate the interaction during the later timeslot with the user service center, the notification being provided at a time associated with the later timeslot.

15. The system of claim 14 wherein the delayed access module is further configured to periodically provide the notification during the later timeslot until such a time the user initiates the interaction.

16. The system of claim 11 wherein the delayed access module is further configured to:
during the previous interaction, create and, if necessary, provide the identifier to the user, the identifier providing the user with priority access to the user service center at a timeslot to continue the previous interaction, and
map the identifier to a priority access mechanism associated with the timeslot.

17. The system of claim 11 wherein the identifier includes a relative priority identifier that identifies a relative priority of the user with respect to other users associated with respective identifiers qualifying the other users with priority access to the user service center.

18. The system of claim 11 wherein the interaction is at least one of the following:
a phone call, live instant messaging, real-time text messaging, video-chat, remote assistance, speech recognition interaction, natural language understanding interaction, kiosk interaction, and other interaction.

19. The system of claim 11 wherein the identifier is associated with a timeslot to continue the previous interaction during which the user may receive priority access to the user service center, but not during other timeslots; and
wherein the delayed access module is further configured to, for each timeslot, provide a restricted number of identifiers qualifying users for priority access to the user service center.

20. The method of claim 19 wherein the restricted number is selected in a manner that prevents an overflow of interactions during the timeslot based on a predetermined estimated volume of interactions expected to be received during the timeslot.

* * * * *